(12) United States Patent
Gammel et al.

(10) Patent No.: US 7,437,572 B2
(45) Date of Patent: Oct. 14, 2008

(54) KEY MANAGEMENT DEVICE AND METHOD FOR THE ENCRYPTED STORAGE OF DIGITAL DATA WORDS

(75) Inventors: Berndt Gammel, Markt Schwaben (DE); Thomas Kunemund, Munchen (DE); Holger Sedlak, Sauerlach (DE)

(73) Assignee: Infineon Technologies AG (DE)

( * ) Notice: Subject to any disclaimer, the term of this patent is extended or adjusted under 35 U.S.C. 154(b) by 875 days.

(21) Appl. No.: 10/913,956

(22) Filed: Aug. 6, 2004

(65) Prior Publication Data

US 2005/0044392 A1    Feb. 24, 2005

Related U.S. Application Data

(63) Continuation of application No. PCT/DE03/00184, filed on Jan. 23, 2003.

(30) Foreign Application Priority Data

Feb. 8, 2002    (DE) ................. 102 05 316

(51) Int. Cl.
*G06F 7/00* (2006.01)

(52) U.S. Cl. ............... 713/193; 713/189; 713/190; 713/193; 380/37; 380/44; 380/239; 380/243

(58) Field of Classification Search .......... 713/193, 713/189, 190; 380/37, 44, 239, 243
See application file for complete search history.

(56) References Cited

U.S. PATENT DOCUMENTS

| 5,915,025 | A | * | 6/1999 | Taguchi et al. ............ 380/44 |
| 5,987,572 | A | * | 11/1999 | Weidner et al. .......... 711/155 |
| 6,658,566 | B1 | * | 12/2003 | Hazard ................... 713/172 |
| 2002/0076204 | A1 | * | 6/2002 | Nakano et al. ............ 386/94 |

FOREIGN PATENT DOCUMENTS

| DE | 34 07 642 C2 | 9/1984 |
| DE | 199 64 198 A1 | 4/2001 |
| GB | 2 321 728 A1 | 8/1998 |
| WO | WO-98/40853 A1 | 9/1998 |
| WO | WO-01/40950 A3 | 6/2001 |
| WO | WO-01/53931 A2 | 7/2001 |
| WO | WO-01/54083 A1 | 7/2001 |

OTHER PUBLICATIONS

Dave MacMillan; "Single Chip Encrypts Data at 14 Mb/s"; Electronics, Jun. 16, 1981, pp. 161-165.

* cited by examiner

*Primary Examiner*—Kambiz Zand
*Assistant Examiner*—Yonas Bayou
(74) *Attorney, Agent, or Firm*—Dickstein, Shapiro, LLP.

(57) ABSTRACT

Key management device for electronic memories and a method for the encrypted storage of digital data words in electronic memories, in which each stored data word is encrypted with a digital keyword, which may be different from another digital keyword of another stored data word.

12 Claims, 1 Drawing Sheet

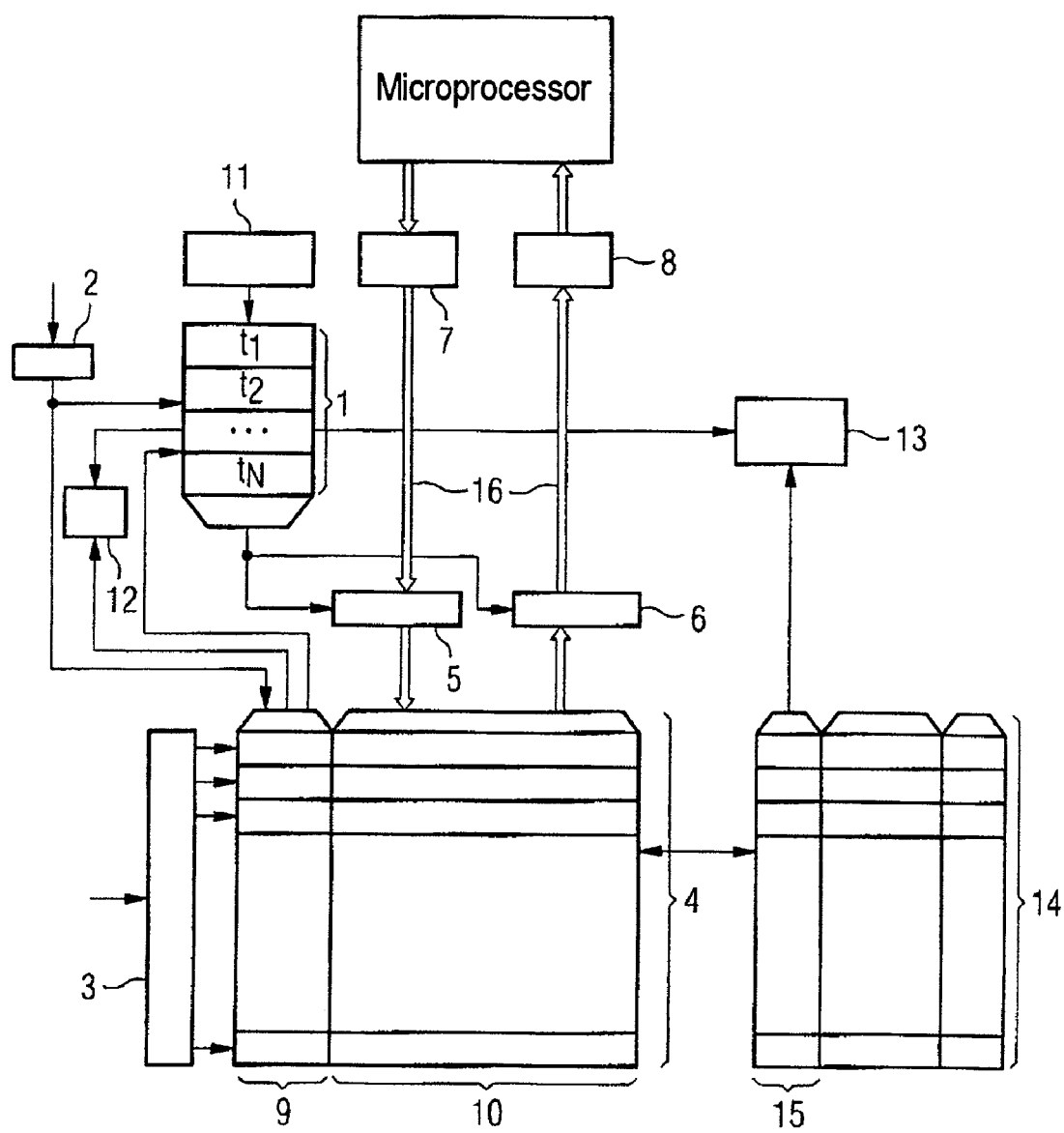

KEY MANAGEMENT DEVICE AND METHOD FOR THE ENCRYPTED STORAGE OF DIGITAL DATA WORDS

CROSS-REFERENCE TO RELATED APPLICATION

This application is a continuation of International Patent Application Serial No. PCT/DE03/00184, filed Jan. 23, 2003, which published in German on Aug. 14, 2003 as WO 03/067438, and is incorporated herein by reference in its entirety.

FIELD OF THE INVENTION

The invention relates to a key management device for electronic memories and a method for the encrypted storage of digital data words in electronic memories.

BACKGROUND OF THE INVENTION

Electronic memories are basically differentiated into two different types of memory. Firstly there are volatile memories such as RAM and memories having short access times, which are often used as a buffer memories, such as cache memories; secondly there are non-volatile memories such as ROM and EEPROM. What is common to all these memories is that they are constructed from regular, orderly structures and are therefore easily, analyzed or manipulated.

It is for this reason that, in security-critical applications, the data which are stored electronically in the memories are protected by suitable cryptographic encryption methods, that is to say the data are stored in encrypted form.

Access to encrypted information in the memories is inevitably accompanied by longer access times to the data, since the data have to be encrypted when they are read into the memory and decrypted when they are read from the memory. This is unavoidable and accepted in the case of external storage media such as smart cards. Memories, however, which have the task of buffer-storing data and making said data available again rapidly, such as buffer memories, caches or the like, cannot employ complex and time-consuming encryption methods on account of their task.

The published patent applications WO 01/54083 A1 and WO 01/53931 A3 proposed, for such memory applications, temporarily valid keywords with which all the data words are encrypted by means of a simple method and are stored in encrypted form in this way in said memory. In this case, the key can be changed or renewed with higher or lower frequency, depending on the security requirement.

After a keyword has been updated, the data content which is situated in the memory and encrypted with the preceding keyword cannot be decrypted. In order to avoid this, when the keyword is changed, the memory content has to be re-encrypted and loaded into the memory again. If the security requirements are high and the key is changed often for this reason, this leads to noticeable dips in performance. The result, then, is a conflict between security and performance.

SUMMARY OF THE INVENTION

The invention is based on an object of ensuring, even in the case of a frequent key change, on account of a high security requirement, a high performance and associated short access times to the data.

In this case, a multiplicity of keywords are simultaneously available for encrypting sensitive data. When a data word is read into a memory, a key selection device selects an active key from a keyword memory according to a predetermined algorithm. Said key is then provided with an unambiguous marker, as is a data word that is encrypted with it. The data word is encrypted by means of an encryption device and stored in the memory. The marker is stored in parallel with the storage of the encrypted data word. In this case, the marker establishes an unambiguous connection between encrypted data word and the associated keyword.

A different keyword can then be chosen for each further storage operation. What is advantageous about this method is that a new keyword can be chosen for each storage operation and, as a result, a maximum expedient frequency is achieved for keyword renewal.

If a specific data word is then intended to be read out, a first comparison device determines, by means of the marker of the encrypted data word, the suitable keyword in the keyword memory and feeds said keyword to a decryption device. The consequence of this is that the memory contents are encrypted with different keywords in each case and said keywords are always available in a decryption operation. When a keyword is renewed, the entire memory need not be newly read in and encrypted, but rather always remains decryptable.

The implementation of a validity duration of the individual keywords constitutes an advantageous extension of the invention. In this case, keywords which have already been ready for a defined time in the keyword memory are no longer used for new encryption operations. These keywords are erased only when all the data words that are encrypted with them have been read, or removed, from the memory.

In further advantageous refinements of the invention, the encryption unit and the decryption unit are combined to form a common encryption and decryption unit.

Furthermore, it is advantageous for the input of the key management device and the output of the key management device to be realized by a bidirectional data bus.

A further advantageous refinement of the invention provides a further or a second comparison device for a buffer memory whose contents correspond to the central memory unit. Said comparison device checks the memory content of the buffer memory for the existence of encrypted data words with markers for the existence of encrypted data words with markers of keywords that have already been removed from the pool. If the existence of such an encrypted data word is ascertained, it is removed from the buffer memory.

A further advantageous refinement provides for al those encrypted data words of the buffer memory to be written back to the main memory and re-encrypted for the case in which the markers of the encrypted data words refer to keys which are no longer used for new encryption operations and, for this reason, will soon no longer be available in the key memory for decryption. What is advantageous in this case is that contents of the buffer memory do not lose their validity solely through an unchecked erasure of the keywords.

BRIEF DESCRIPTION OF THE DRAWING

The invention will be described in more detail below using an exemplary embodiment, with reference to the FIGURE.

DETAILED DESCRIPTION OF THE PREFERRED MODE OF THE INVENTION

The FIGURE shows a key management device according to the invention for electronic memories with its individual components and the interconnections thereof as a basic illustration.

A keyword memory 1 contains all of the available keywords $t_1$ to $t_n$. The supply of new keywords to the keyword memory 1 is ensured via a second input 11.

During a storage operation, a key selection device 2 selects an active key, from the keyword pool situated in the keyword memory 1, whereupon said key is used in the encryption unit 5 for encrypting the data word. In this case, an encrypted data word is stored with the marker of its key in a central memory unit 4. In this case, the encrypted data word is stored in a second memory cell, and the marker of the encrypted data word is stored in a first memory cell of the central memory unit 4. An addressing unit 3 is used to address the memory cells.

A read-out operation from the memory is effected in the opposite way. In this case, the marker of the encrypted data word is read from the first memory cell 9 of the central memory unit 4 and the matching keyword from the keyword memory is determined by a first comparison device 12. A decryption unit 6 then decrypts the stored information with the selected keyword.

A further example describes the application of the invention to buffer memories, so-called cache memories. In the case of cache memories, all encrypted data words have to be removed from the memory whose maker refers to a key which is no longer available for decryption. In order to carry this out, it is possible to implement an erasure mechanism which marks these encrypted data words entered in the cache memory as invalid. In order to realize such an erasure mechanism, the memory arrays in which the markers of the encrypted data words are stored are designed as a content addressable memory. Before a keyword is erased from the keyword memory, the marker of the said key is then sought in said content addressable memory. In this case, a circuit ensures that each data word with the marker of the key is marked as invalid.

It is also possible for the data entries of the cache memory to be written back to the underlying main memory. It is thus possible to ensure the consistency between cache memory and main memory.

It is expedient to design the search for the marker such that, during the search, the markers found and the associated encrypted data words are sought and the key is erased from the keyword memory only when an associated data word is no longer present in the cache memory.

In order to control the sequences described, a register can be connected to the key management device according to the invention, which register contains the information for each individual action required. This includes:
 a) the comparison or the search for a specific marker of a specific keyword.
 b) in the case where the invention is used with a cache memory, invalidating encrypted data words with the marker of a keyword that is no longer valid,
 c) a function which can initiate the write-back from the cache memory to the main memory,
 d) an indication of whether and, if so, how many encrypted data words exist with markers which refer to keywords that are not valid or are no longer valid, and
 e) providing the information necessary for the write-back from a cache.

The invention claimed is:

1. A key management device for electronic memories, comprising:
 a keyword memory configured to simultaneously store a plurality of digital keywords;
 a key selection device which is connected to the keyword memory;
 a central memory unit, which contains first memory cells for storing markers and second memory cells for storing encrypted data words;
 an addressing unit configured to address the first and second memory cells of the central memory unit;
 an encryption unit, which is connected to the second memory cells and the keyword memory; and
 a decryption unit, which is connected to the second memory cells and the keyword memory;
 wherein the key selection device is configured to:
  a) select a digital keyword, which may be different from another digital keyword, used to encrypt each data word, and
  b) assign a marker configured to associate the digital keyword with the encrypted data word.

2. The key management device as claimed in claim 1, further comprising:
 a first input for the data words to be stored which is connected to the encryption unit;
 an output for the data words to be read out which is connected to the decryption unit; and
 a second input via which the digital keywords are fed to the keyword memory.

3. The key management device as claimed in claim 1, wherein the encryption unit and the decryption unit are combined to form a common encryption and decryption unit.

4. The key management device as claimed in claim 2, wherein the input and the output are realized by a bidirectional data bus.

5. The key management device as claimed in claim 1, further comprising a first comparison device, which is connected to the keyword memory and the first memory cells of the central memory unit, and is configured to compare the markers of the keywords with the stored markers of the encrypted data words.

6. The key management device as claimed in claim 1, wherein the central memory unit is connected to a buffer memory and the contents of the central memory unit and the buffer memory correspond.

7. The key management device as claimed in claim 5, further comprising a second comparison device, which is connected to the keyword memory and a buffer memory and third memory cells situated therein, and is configured to compare said markers of the keywords with the stored markers of the encrypted data words.

8. A method for encrypted storage of digital data words in electronic memories, comprising:
 encrypting each data word to be stored with a digital keyword, which may be different from another digital keyword;
 selecting, for each encryption operation, according to a predetermined manner, a digital keyword from a pool of digital keywords;
 providing each digital keyword and each data word encrypted therewith with a marker which unambiguously links the digital data word with a digital keyword; and
 storing the digital keywords spatially separately from the encrypted data words.

9. The method as claimed in claim 8, wherein a digital keyword is no longer selected for encryption after a defined validity duration has elapsed, and in which all digital keywords are removed from the pool and replaced by new digital keywords whose validity has elapsed and to which no markers of encrypted data words refer.

10. The method as claimed in claim 9, wherein encrypted data words, which are stored in parallel in connected electronic buffer memories and whose markers refer to keywords which have been removed from the pool, become invalid.

11. The method as claimed in patent claim 10, further comprising writing back to the central memory unit encrypted data words, which are stored in parallel in connected electronic buffer memories and whose markers refer to keywords and whose validity has elapsed but which have not yet been removed from the pool.

12. The key management device as claimed in claim 1, wherein the central memory unit is spatially separate from the keyword memory.

* * * * *